US010986159B2

(12) United States Patent
Goel et al.

(10) Patent No.: US 10,986,159 B2
(45) Date of Patent: Apr. 20, 2021

(54) CLIENT SIDE CACHE VISIBILITY WITH TLS SESSION TICKETS

(71) Applicant: Akamai Technologies, Inc., Cambridge, MA (US)

(72) Inventors: Utkarsh Goel, San Mateo, CA (US); Martin T. Flack, Denver, CO (US); Stephen L. Ludin, Mill Valley, CA (US); Moritz M. Steiner, San Anselmo, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/752,320

(22) Filed: Jan. 24, 2020

(65) Prior Publication Data

US 2020/0236156 A1 Jul. 23, 2020

Related U.S. Application Data

(63) Continuation of application No. 15/835,400, filed on Dec. 7, 2017, now Pat. No. 10,581,948.

(51) Int. Cl.
*G06F 15/16* (2006.01)
*H04L 29/08* (2006.01)
*G06F 16/957* (2019.01)
*H04L 29/06* (2006.01)
*H04L 29/12* (2006.01)

(52) U.S. Cl.
CPC .......... *H04L 67/02* (2013.01); *G06F 16/9574* (2019.01); *H04L 63/00* (2013.01); *H04L 67/26* (2013.01); *H04L 61/1511* (2013.01); *H04L 67/289* (2013.01); *H04L 67/2842* (2013.01)

(58) Field of Classification Search
CPC ....... H04L 67/02; H04L 67/26; H04L 67/289; H04L 67/2842; H04L 63/00; H04L 61/1511; H04L 67/2847; G06F 16/9574; G06F 16/957; G06F 12/0862
See application file for complete search history.

(56) References Cited

U.S. PATENT DOCUMENTS

| 9,026,784 B2 * | 5/2015 | Buruganahalli ...... G06F 21/606 713/151 |
| 10,581,948 B2 | 3/2020 | Goel |
| 2005/0154872 A1 | 7/2005 | Mcgrew |

(Continued)

FOREIGN PATENT DOCUMENTS

WO 2013112816 A1 8/2013

OTHER PUBLICATIONS

MPEP 609.02 Statement filed with this SB/08, Jan. 24 2020, 2 pages.
U.S. Appl. No. 15/835,400, filed Dec. 7, 2017.

*Primary Examiner* — Oleg Survillo (57) ABSTRACT

Among other things, this document describes systems, devices, and methods for using TLS session resumption tickets to store and manage information about objects that a server or a set of servers has previously delivered to a client and therefore that the client is likely to have in client-side cache. When communicated to a server later, this information can be used to drive server decisions about whether to push an object to a client, e.g., using an HTTP/2 server push function or the like, or whether to send an early hint to the client about an object.

7 Claims, 6 Drawing Sheets

(56) References Cited

U.S. PATENT DOCUMENTS

| | | |
|---|---|---|
| 2005/0154873 A1 | 7/2005 | Cam-winget et al. |
| 2016/0048685 A1 | 2/2016 | Adam et al. |
| 2018/0351998 A1 | 12/2018 | Lee et al. |
| 2019/0182349 A1 | 6/2019 | Goel et al. |

\* cited by examiner

CLIENT SIDE CACHE VISIBILITY WITH TLS SESSION TICKETS

This application is a continuation of, and claims the benefit of priority to, U.S. application Ser. No. 15/835,400, filed Dec. 7, 2017, the contents of which are hereby incorporated by reference in their entirety.

BACKGROUND

Technical Field

This application relates generally to content delivery and to systems and methods for enabling server visibility into a client side cache and thereby enabling intelligent server push to clients as well as intelligently sending early hints to a client.

Brief Description of the Related Art

Server Push

The Hypertext Transfer Protocol (HTTP) is a well-known application layer protocol. It is often used for transporting HTML documents that define the presentation of web pages, as well as the embedded objects associated with such pages. The HTTP 1.0 and 1.1 standards came about in the 1990s. In 2015, the IETF released RFC 7540, which specifies the HTTP/2 standard. The HTTP/2 protocol was in development for some time (see, e.g., HTTP version 2, working draft, draft-ietf-httpbis-http2-16, Nov. 29, 2014). According to that working draft and RFC 7540, HTTP/2 enables efficient use of network bandwidth and a reduced perception of latency by introducing header field compression and allowing multiple concurrent messages on the same connection. It also introduces unsolicited push of representations from servers to clients. HTTP/2 is based on an earlier protocol, SPDY, which also included an unsolicited push feature.

It is known in the art to use some form of a prediction to push one or more objects to a client using the push mechanism contemplated in SPDY and HTTP/2. This is often referred to as "server push". While server push offers the opportunity for increased performance, however, it must be used wisely. Specifically, if the prediction is wrong or if the client already has the object in a client-side cache, pushing content to a client can result in wasted bandwidth and delayed first paint or page load time. To address these issues, it has been proposed in the prior art that the hint mechanism of SPDY could be used to search the browser's cache to ensure that already-cached objects are not re-fetched by the proxy. (See, e.g., Nicholas Armstrong, Just in Time Push Prefetching: Accelerating the Mobile Web, University of Waterloo Master's Thesis, 2011.) Further, Uzonov (Andrey Uzonov, Speeding Up Tor With SPDY, Master's Thesis, Munich Technical University, 2013) proposes collecting statistical data about object requests for a page, and for subsequent page requests, pushing objects when his proposed algorithm(s) are confident enough that they would be requested in the page load. The algorithms described by Uzonov take into account the frequency with which an object is requested overall, or for a particular page load, as well as the number of times that an object has been seen after the first page load in a session, or in prior page loads. Several algorithms are proposed. Uzonov investigates the use of a cost function for pushing objects that accounts for hits and mistakes. Uzonov also proposes, among other things, considering the device type or browser type (user-agent) in determining whether to push assets, setting a maximum asset size for push, and keeping track of the assets that have been provided to the client previously (at the server or at the client) to avoid re-sending them. For example, Uzonov proposes using a Bloom filter sent by the client to track whether an object is cached at the client.

U.S. Patent Publication No. 2009/0024801, which is not incorporated by reference but merely identified for background and context, describes a method and system to detect a cached web page that involves a cookie generator, cookie distributor and cookie evaluator. US Patent Publication No. 20060106807, which is not incorporated by reference but merely identified for background and context, describes a system and method in which a cookie contains a list of files that includes the files currently stored on a local media file cache. See, for example, paragraphs 52-53 and 62-63. See also draft-ietf-httpbis-cache-digest-02, May 30 2017, which states that it defines a HTTP/2 frame type to allow clients to inform the server of their cache's contents; this is done by sending a data structure referred to as a cache digest. Servers can then use this to inform their choices of what to push to clients.

Further, US Patent Publication Nos. 2016/0226998, 2016/0226969, and 2016/0248866, all incorporated by reference herein, describe (among other things) methods and systems related to determining whether and which objects to push to a client.

While the foregoing approaches are valuable, the teachings hereof provide unique and improved methods to avoid pushing objects to a client that the client is likely to have stored in its client side cache, such as those cacheable objects that have been sent to the client already, e.g., by that server or a related server (such as another server in a CDN), when leveraging a push mechanism such as that provided HTTP/2. The teachings hereof are not necessarily limited to HTTP/2, but apply to any mechanism for pushing web page components from a server to a client.

Early Hints

Some in the industry advocate for the use of a technique named 'Early Hints' as an alternative to the server push model embraced by HTTP/2. An Early Hint refers to an informational status code for HTTP that can be used for indicating hints to help a client start making preparations for processing the final response. A server can send an 'early hint' to a client by sending certain headers of objects that are likely to be included in the final response, and then take the time to generate the final response and send it to the client. More information about Early Hints can be found in an IETF draft titled 'An HTTP Status Code for Indicating Hints, draft-kazuho-early-hints-status-code-00, by K. Oku, Oct. 31, 2016. Early hints can be used with both HTTP/1.1 and HTTP/2.

Sending an early hint for an object that the server has already pushed or early hinted to the client, or that is otherwise likely to be in the client's cache, can be wasteful too. Such an unnecessary early hint represents wasted bytes on the wire to send the hint, as well as wasted processing cycles for a client to process the early hint for an object that it already has in local cache.

The teachings of this document can be used by a server to avoid sending early hints for objects that a client is likely to have stored in its client side cache already.

Whether via the reduction of unnecessary server pushes, early hints, or other enhancements enabled by better knowledge about the contents of a client-side cache, the teachings hereof can be used to improve the efficiency of web page loading and of network usage, among other things. The teachings hereof address this technical problem. The teachings hereof also provide other benefits and improvements that will become apparent in view of this disclosure.

A general background on a content delivery network "CDN", is now provided, as the teachings hereof can be used, without limitation, in a CDN.

A "content delivery network" or "CDN" is often operated and managed by a service provider. The service provider typically provides the content delivery service on behalf of third party content providers. A distributed system of this type typically refers to a collection of autonomous computers linked by a network or networks, together with the software, systems, protocols and techniques designed to facilitate various services, such as content delivery or the support of outsourced site infrastructure. The infrastructure is generally used for the storage, caching, or transmission of content—such as web page objects, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN's components may be located at nodes that are publicly-routable on the Internet, within or adjacent nodes that are located in mobile networks, in or adjacent enterprise-based private networks, or in any combination thereof.

Figure 1:
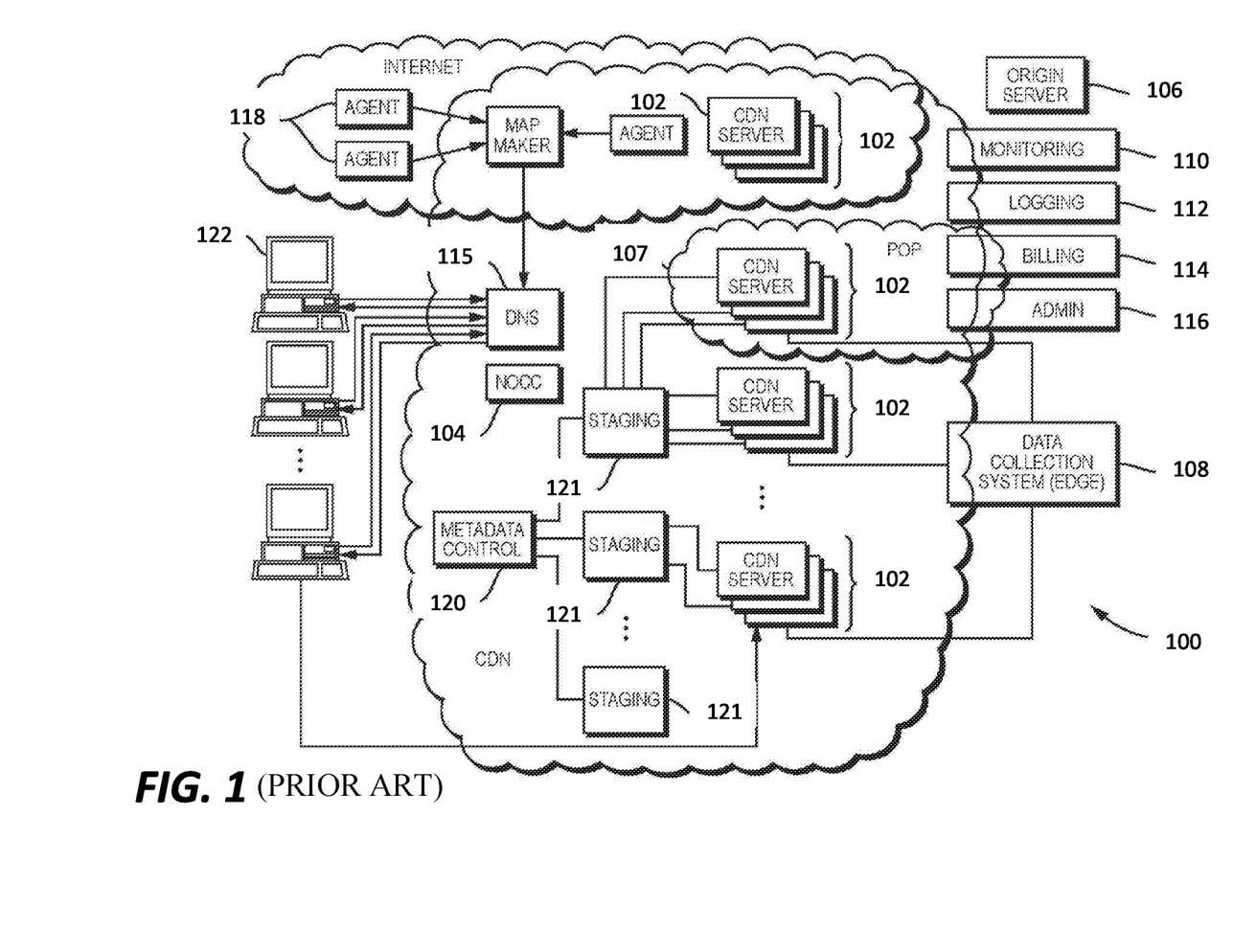
FIG. 1 is a schematic diagram illustrating one embodiment of a distributed computer system configured as a CDN.

In a known CDN system such as that shown in FIG. 1, a distributed computer system 100 is configured as a content delivery network (CDN) and has a set of computers 102 distributed around the Internet. Typically, most of the computers are configured as servers and located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the servers (which are sometimes referred to as content servers, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client devices 122 that desire such content may be directed to the distributed computer system to obtain that content more reliably and efficiently. The CDN servers 102 respond to the client device requests, for example by obtaining requested content from a local cache, from another CDN server 102, from the origin server 106, or other source.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN, and which acts as a request routing mechanism to direct clients to a selected CDN server 102. A distributed data transport mechanism 120 may be used to distribute control information (sometimes referred to as "metadata") to the CDN servers.

A more detailed description of an embodiment of a CDN server 102 is now provided. A given CDN server can be implemented as a computer that comprises commodity hardware (e.g., a microprocessor with memory holding program instructions) running an operating system kernel (such as Linux® or variant) that supports one or more applications. To facilitate content delivery services, for example, given computers typically run a set of applications, such as an HTTP (web) proxy server, a name service (DNS), a local monitoring process, a distributed data collection process, and the like. The HTTP proxy server (sometimes referred to herein as a HTTP proxy for short) is a kind of web server and it typically includes a manager process for managing a local cache and delivery of content from the machine. For streaming media, the machine may include one or more media servers, as required by the supported media formats.

A CDN server 102 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (again sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

Preferably, the CDN operates a DNS infrastructure to route client requests (i.e., request routing service) to a selected CDN server 102. In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname the CDN, and that hostname is then resolved through the CDN name service. To that end, the CDN domain name service returns one or more IP addresses (via consultation with the mapmaker shown in FIG. 1). The requesting client application (e.g., a web browser) then makes a content request (e.g., via HTTP or HTTPS) to a CDN server 102 associated with the IP address. The request includes a host header that includes the original content provider domain or sub-domain. Upon receipt of the request with the host header, the CDN server 102 checks its configuration file to determine whether the content domain or sub-domain requested is actually being handled by the CDN. If so, the CDN server 102 applies its content handling rules and directives for that domain or sub-domain as specified in the configuration. These content handling rules and directives may be located within an WL-based "metadata" configuration file, as described previously. Thus, the domain name or subdomain name in the request is bound to (associated with) a particular configuration file, which contains the rules, settings, etc., that the CDN server 102 should use when processing that request.

A CDN may have a variety of other features and adjunct components. For example the CDN may include a network storage subsystem (sometimes referred to as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. In a typical cache hierarchy, each client-facing server has a cache parent (or cache parent group), which may be statically or dynamically assigned. The child server goes to the cache parent to see if it has the object before going to the origin. If the parent does not have the object in cache either, then either the parent or the child server goes to origin. Some cache hierarchies have additional layers. For more information on cache hierarchies in CDNs, see U.S. Pat. No. 7,376,716 and see also Chankhunthod et al., "A Hierarchical Internet Object Cache", Proceedings of the USENIX 1996 Annual Technical Conference, San Diego, Calif. 1996., the disclosure of both of which is incorporated herein by reference for all purposes. For information on how cache parents can be dynamically chosen (and cache hierarchies formed based on network conditions and distances), see U.S. Pat. No. 7,274,658 the disclosure of which is incorporated by reference herein for all purposes.

Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, as well as a transcoding system as described in U.S. Pat. No. 9,432,704, the disclosures of which are incorporated herein by reference.

BRIEF SUMMARY

Among other things, this document describes systems, devices, and methods for using TLS session resumption tickets to store and manage information about objects that a server or a set of servers has previously delivered to a client and therefore that the client is likely to may have in client-side cache. When communicated to a server later, this information can be used to drive server decisions about whether to push an object to a client, e.g., using an HTTP/2 server push function or the like, or whether to send an early hint to the client about an object.

The foregoing is merely a brief summary of aspects of the teachings hereof. It is not limiting as the claims alone define the scope of legal protection that is sought.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The terms "resource" and "object", as in "embedded resource" or "embedded object," are used interchangeably in this document, with no difference in meaning intended.

Introduction

There are a number of content delivery techniques that could benefit from a server having better knowledge about the contents of a client's cache. Among these techniques are server push, in HTTP/2, as well as Early Hints, which is applicable to both HTTP/1.1 and HTTP/2. Transport Layer Security (TLS) session tickets can be used to provide knowledge about a client's cache, in accordance with the teachings hereof. The detailed description below discusses these topics, beginning with a discussion of HTTP/2 server push and Early Hints.

The HTTP/2 specification includes the concept of server push, in which a server can push to the client (e.g., a browser) certain objects that the server believes the client will need in the future. An example of this is a client requesting a certain base HTML document for a web page and the server responding with the requested HTML document, as well as pushing at least some of the objects that will be needed for the client to render the page.

An example of a request/response flow that utilizes server push in accordance with HTTP/2 specification might be: (1) Client requests an HTML document for a page from a server; (2) Server responds with a series of PUSH_PROMISE frames of objects that will be pushed; (3) Server responds with the headers and body of the requested HTML document and then starts pushing the objects needed to fully load the page. (While it is preferable to send the HTML as soon as possible, in some cases, the server can first push the headers or both headers and bodies of some of the promised objects and then respond with the headers and body of the requested HTML document. That is, the HTML and page objects can be sent in various orders under the HTTP/2 specification.) The pushed objects can be selected based on a prediction algorithm or otherwise configured for the given page or domain, for example. (4) If the client has any of the objects the server will push, e.g., in local cache such as HTML local storage, browser cache, or otherwise, the client can send RST_STREAM frames for these objects as soon as the client receives the PUSH_PROMISE. This will stop the server from sending or continuing to send any objects that the client already has in cache. (5) Client sends separate requests for any other objects needed to render the page.

As discussed earlier, pushing an object can provide a performance benefit, but pushing objects that the client already has in cache can decrease overall performance. When a server is pushing an object that the client already has in its cache, a client can and should send an RST_STREAM frame to prevent the server from sending this object, thereby freeing the connection for other needed objects. Sending such cached objects is considered a performance penalty because pushing the objects that the client has in the cache can delay delivering other resources that the client actually needs. A determination to send the RST_STREAM takes processing on the client. Moreover the sending of a RST_STREAM frame represents processing and bytes-on-the-wire that are unnecessary and should be avoided. Also, depending on the round-trip time of the connection between the client and the server, the server may end up receiving the RST_STREAM after the server has completed sending the unwanted object.

Early Hints

A technique named 'Early Hints' is an alternative to the server push model embraced by HTTP/2. Early Hints are described in an IETF draft titled 'An HTTP Status Code for Indicating Hints, draft-kazuho-early-hints-status-code-00, by K. Oku, Oct. 31, 2016. According to that document, an Early Hint refers to an informational status code for HTTP that can be used to convey a 'hint' that helps a client start making preparations for processing the final response. More specifically, the 'hint' tells the client that the server will likely send a full response with the header(s) that are in the hint. Hence, a server can send an 'early hint' to a client and then take the time to generate a full response (with headers and body) to the client's request. As with server pushes, sending an early hint for an object that a client already has in cache can be wasteful, not only from a server processing load and client processing load perspectives, but also from the perspective of network traffic load.

Server Push and Early Hints with TLS Session Tickets

RFC 5077 (January 2008) states that it describes a mechanism that enables a server with a Transport Layer Security (TLS) session to a client to pause and resume sessions with the client and avoid keeping per-client session state. The server is able to do this by encapsulating the session state into a ticket and forwarding it to the client during an active session. The client can subsequently resume the session using the obtained ticket.

According to the teachings hereof, this mechanism can be adapted for the purpose of improving server push. It can be modified to enable the server to store a record of objects cached or potentially cached at the client, and to advertise those objects back to a server, so that the server can avoid pushing those objects.

Typically, a server stores information for resuming a session, such as the server's session key and other parameters, in the TLS ticket. However, according to the teachings hereof, instead of (or in addition to) storing such session resumption information in the ticket, the server can store information about objects that it has sent to the client, e.g., in response to a client request and/or using server push. Associated time-to-live (TTL) information for each of those objects may also be stored. Later, when the server (or a different server) gets the ticket from the client, it can use this information to determine the objects that may still be cached on the client, and therefore do not need to be pushed (as doing so would be moot and likely yield an RST_STREAM from the client).

More specific examples will now be provided. For the following example, assume that a client makes object requests to a server during a TLS session and that the TLS session will be stopped and then resumed a number of times. Assume further that the initial request is an HTTP/2 GET request for an HTML document defining a web page. Assume further that the HTML document contains references to a number of embedded objects, such as CSS files, scripts (e.g., Javascript), images, video objects, and the like, which the client can request also using HTTP/2 GET requests.

Initial Part of Session

In one embodiment, the client and server initiate a TLS session and on top of that an HTTP/2 session. Typically the TLS session is established over a TCP connection, and thus can be referred to as a TLS-secured connection, although using TCP is not strictly necessary. The client makes an initial request to the server, typically for an HTML document, but may make other objects requests as well. During the HTTP/2 session, the server delivers at least some of these embedded objects to the client. The various objects may be transmitted by the server in a server push, or in response to a request frame from the client. The server can keep a record of the objects that it has sent to the client and store this in its memory. A simple format for recording the objects might be list of objects identified by URL and for each object an associated time to live (TTL) and an associated timestamp at which the object was retrieved from origin. A valid, unexpired TTL indicates that the object is still likely stored in a client-side cache; an expired TTL indicates that the object, even if was cached before, has expired out of the client side cache. This information is referred to hereafter as "client cached object data" for convenience, or with equivalent meaning as the "client cached object manifest". A simple example of client cached object data for a given set of objects A,B, and C might a file with the following format:

```
{
    "client_id": 123, // unique_id
    "ticket_timestamp": "2017-11-05T17:30Z" // preferably in ISO 8601 format
    "object_A": {"URL": "www.example.com/pathname/A.gif", "Cache-Control": "private,
max-age=86400", "Content-Type": "image/gif", object_timestamp:"2017-11-23T14:30Z"},
    "object_B": {"URL": "www.example.com/secondpathname/B.js", "Cache-Control":
"public, max-age=172800", "Content-Type": "text/javascript", object_timestamp:"2017-12-
11T09:24Z"}
    "object_C": {"URL": "www.example.com/thirdpathname/C.css", "Cache-Control":
"public, max-age=86400", "Content-Type": "text/css", object_timestamp:"2017-12-10T10:30Z"}
}
```

The format above may become unwieldy if the list of objects is long. Alternate approaches include using a Bloom filter. The Bloom filter is known in the art as a data structure that is compact in size and can be used to test whether a given item (e.g., an embedded web object) is a member of a set (e.g., is it an object that was sent to the client previously). Bloom filters give probabilistic answers to that question. In this embodiment, the server calculates the Bloom filter and will store it on the client in the ticket, i.e., the Bloom filter data structure represents the client cached object data.

In another embodiment, the objects can be listed in the manifest with a simple Boolean 'true'/'false' to indicate whether they were sent to the client. This approach assumes that a list of push candidates is established for each domain, subdomain or other defined set of web pages; in effect, the status of each push candidate is indicated with the true or false. If the list of objects is stored an ordered list, then special notations might be used to encode information such as "objects 1 to 9 are marked TRUE" (have been sent). This approach may be limited to use with objects that have a long time to live value that will likely not have elapsed when the TLS session resumes.

Regardless of format, using the techniques described in RFC 5077, the server can encrypt and store this client cached object data in a ticket. Preferably, the client cached object data is stored in the opaque encrypted state field in the ticket structure, e.g.,:

```
struct {
    opaque key_name[16];
    opaque iv[16];
    opaque encrypted_state<0..2^16-1>;
    opaque mac[32];
} ticket;
```

The server may not be able to send the client cached object data to the client right away or during the initial part of the session. This is because the specification defined in RFC 5077 indicates that a server is only able to send a new ticket to the client during TLS session establishment (the TLS "handshake"), at the time when the server sends its certificate. For that reason, preferably the server temporarily stores the client cached object data in server-side memory, until a ticket with that data can be placed on the client. Note that the client cached object data, while on the server, may be stored in any format—e.g., it may be stored already as a ticket as specified in RFC 5077, or in a different manner, and then later as needed encoded into a ticket.

"Part 2" of Session

Assume that the connection between the server and client is closed, either affirmatively or due to timeout, or other reason. The TLS session is therefore considered to be paused. Next assume that the client desires to open a new TCP connection to the server and resume the TLS session using an abbreviated TLS handshake. At this point, the server can complete an abbreviated TLS handshake and send a new session ticket to the client during that abbreviated TLS handshake, as specified in RFC 5077, FIG. 2. The server can place in the ticket the client cached object data for objects sent in the initial part of the session on the client.

Note that the server preferably performs a "TTL check" before placing or updating the ticket. This means that the server checks the TTL of each object that is in the client cached object data in the existing ticket (if any) or in the client cached object data in the server memory. If an object's TTL has expired, it is removed. This can happen if the object's TTL was less than the time between the initial part of the session and part 2 of the session. In particular, using the object's timestamp and the TTL, the server can check to see if the TTL has expired.

In an alternate embodiment, in which object timestamps are not used, the server can also adjust the TTL of objects that are still valid. For example, if an object originally had a TTL of 100 seconds when it was sent to the client during the initial part of the session, and 50 seconds has elapsed until the TTL check, then the server can adjust the object's TTL to be 50 seconds before storing its record in the ticket.

During the second part of the session, the server preferably does two other things: (1) it avoids pushing objects that the client may already have in the client's cache, based on the contents of the client cached object data from the initial part of the session. This means that it suppresses a push operation for objects that are identified in the client cached object data whose TTL has not expired, and of course assuming that the TLS session ticket itself is not expired. Likewise, the server can suppress an early hint for such objects. Second (2), the server tracks the objects that it transmits to the client during the second part of the session. As during the initial part of the session, the objects that the server tracks includes both pushed objects and objects that the client requested the server served to the client. These objects are added to the list of objects in the client cached object data. The data for the objects that were sent during the initial part of session can be deleted from the client cached object data in the server's memory, because the entries for those objects are now stored in the ticket on the client.

"Part 3" of Session

Assume the connection becomes inactive but once again the client resumes. In this case, to resume the TLS session, the client will send the TLS ticket to the server during the TLS handshake and the ticket will contain the client cached object data about objects sent to the client during the initial part of the session. It would not contain the client cached object data about any objects sent during the second part of the session, but that data is available in the server-side memory. During the third part of the session the server can consult both of these sources to determine whether or not a client is likely to have a particular object cached, and hence whether to push or send an early hint for that object. Once again, the server consults the TTL to determine if a given object has expired.

During the TLS handshake for this third part of the session, the server will issue a new, updated ticket, which the server creates by removing any expired entries from the client cached object data in the prior ticket and adding entries for the objects sent during the second part of the session, which were stored in server memory as the client cached object data. As described earlier, preferably the server performs a TTL check on the entries. This process can be thought of as "reconciling" the client cached object data from the session ticket with the client cached object data from the server memory to create a new, updated set of client cached object data, which is stored in the ticket.

Objects sent after the TLS handshake and during the third part of the session are tracked and kept in the client cached object data in the server memory, as before. The entries about objects sent during the prior portions (i.e., the initial part and part 2) of the session can be deleted from the memory because they are now stored in the ticket on the client.

This process repeats as long as the client keeps resuming the session and the session ticket remains valid (that is, unexpired). After a configured time period, the server's store of client cached object data can be deleted under the assumption that the connection is stale, i.e., client is no longer going to resume the connection.

Figure 2A:
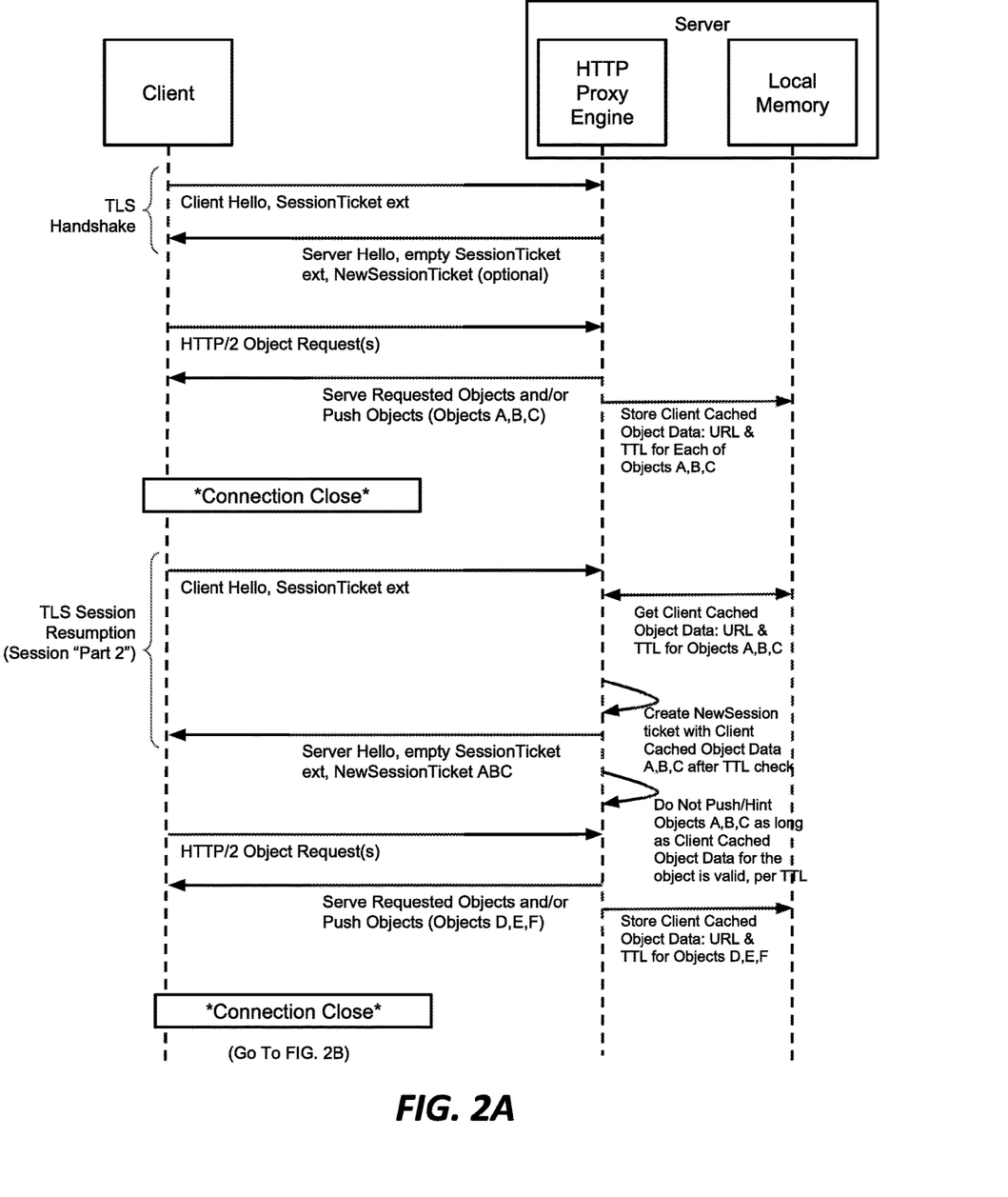
FIG. 2A is a diagram illustrating the message flow in the system between a client and a server, in accord with one embodiment.
Figure 2B:
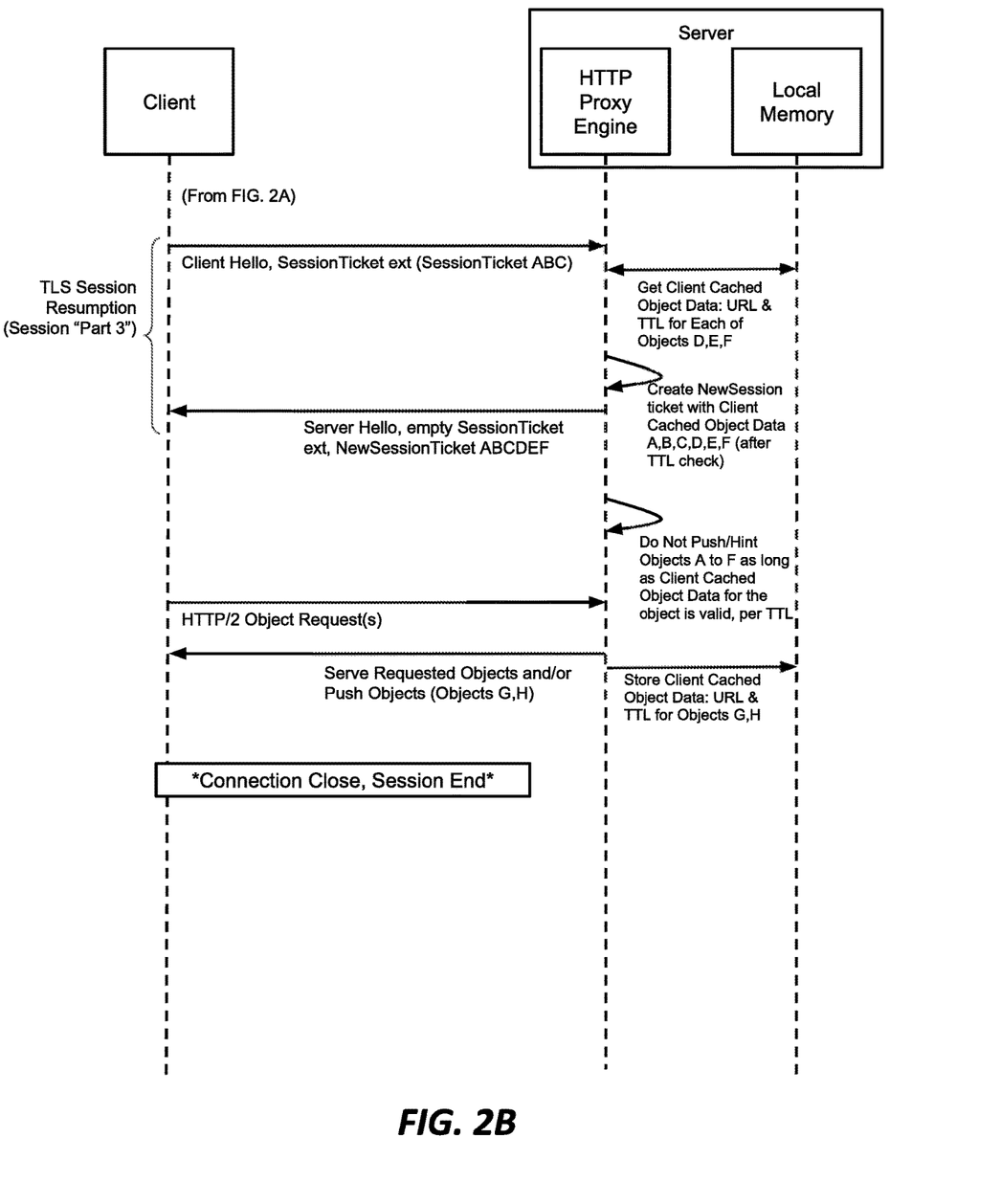
FIG. 2B is a continuation of the diagram of FIG. 2A.

FIGS. 2A-2B provides an illustration of the approach that was described above. FIG. 2B is a continuation of the message flow shown in FIG. 2A.

FIG. 2A begins with an initial TLS handshake. The TLS handshake will occur as part of creating a TCP connection and thus created a TLS-secured TCP connection between client and server. Note that the entire TLS handshake message flow is not shown, but rather only the key parts for understanding the teachings hereof. Those skilled in the art will understand the conventional steps for TCP connections and TLS handshakes and also can consult RFC 5077. In this example, assume that the HTML document sought by the client is located at https://<foo_host>.com/<path_to_HTML> and that the server presents a valid certificate for the hostname <foo_host>.com.

As noted above, the server may or may not set a session ticket during the first handshake, but it is preferable that it does. It is not necessary since the server has nothing to store in the ticket at this point in terms of client cached object data. Of course, it may be desirable to have the server store encrypted state information for resuming the TLS session.

During the initial part of the session, the server serves objects to the client, either based on a server push or in response to a client request. The server tracks these objects and stores them in memory as the current client cached object data for this client. In FIG. 2A, the example is that the server serves objects A, B, and C.

After a pause in the session, the client resumes the session ("Part 2"). The TLS handshake can be abbreviated in this instance, assuming the session state was stored in the ticket initially, per RFC 5077 processes. The server can retrieve from its memory the client cached object data with the references to A,B,C, perform a "TTL check", encode those entries into a ticket if not already in that form, and send the ticket to the client as a session ticket per RFC 5077, here labeled NewSessionTicket ABC. At this point, the server knows not to push object A, B, or C because they are likely cached on the client, as long as the TTL is still unexpired.

Likewise, the server knows not to send early hints for these objects. In this second part of the session, assume the server serves objects D, E and F. The server tracks these facts and keeps record of objects D,E,F in memory, as was done in the initial portion of the session for A,B,C.

When the client resumes the session again ("Part 3"), the client will send and the server will receive NewSessionTicket ABC. It can use the session resumption information therein to complete an abbreviated TLS handshake (optional). It can also extract the client cached object information showing that A,B,C were already sent to the client. In addition, the server knows from its memory that objects D,E,F were already sent to the client. Hence, the server suppresses a push operation (and/or suppresses an early hint operation) for these objects, unless the respective TTL for a given object has expired, in which case that object is available to be pushed or early-hinted again. During the TLS session resumption handshake, the server can store a NewSessionTicket ABCDEF, i.e., combining the information from the prior ticket and the information from server memory. Preferably, the server runs a check on the objects to see if any are expired (the "TTL check"), and removes them from the list before creating and storing the ticket on the client. For example, if object B's TTL has elapsed, then the server preferably removes object B and stores NewSessionTicket ACDEF.

The pattern of tracking served objects and reading and updating the ticket during each portion of the session can continue indefinitely.

Client Cached Object Data

Note that the client cached object data may include a subset of all objects transmitted to the client. Preferably, the server writes only cacheable objects into in this record. Note that for these purposes an object may be considered cacheable if its cache control headers indicate that it is cacheable either on the server (i.e., publicly cacheable) or on the client (i.e., privately cacheable).

Actual Session Resumption Not Necessary

Many of the examples above and FIGS. 2A and 2B have assumed that the client and server are actually taking advantage of the TLS session resumption function, i.e., that the server is encoding handshake parameters into the ticket to enable quick TLS resumption via abbreviated TLS handshake, in addition to encoding the client cached object data. However, it is important to note that it is not necessary to encode TLS handshake parameters into the ticket. Put another way, the server could at each stage received the ticket from the client, and yet require a full handshake and set a new ticket on the client with the latest, updated client cached object data. This would be equivalent to executing FIG. 4 of RFC 5077 each time the client connects.

Server Sharing of Client Cached Object Data

In one embodiment, the server-side client cached object data can be shared amongst groups of servers. In other words, when a server temporarily stores client cached object data in memory server-side, it can also send this to other servers. That way, the other servers can have the data too, if the client resumes the session with one of the other servers, and can combine it with the data in the ticket so that a complete record of the cached objects is obtained.

Partially Stateless Server Embodiment

In the embodiments described above, and in particular with respect to FIGS. 2A-2B, the server temporarily stored the client cached object data in local memory until it could be recorded in a ticket. In an alternate embodiment, illustrated in FIGS. 3A-3B, a set of two servers can be used to avoid the need for the client cached object data to be stored in local memory or at all on the server-side.

Figure 3A:
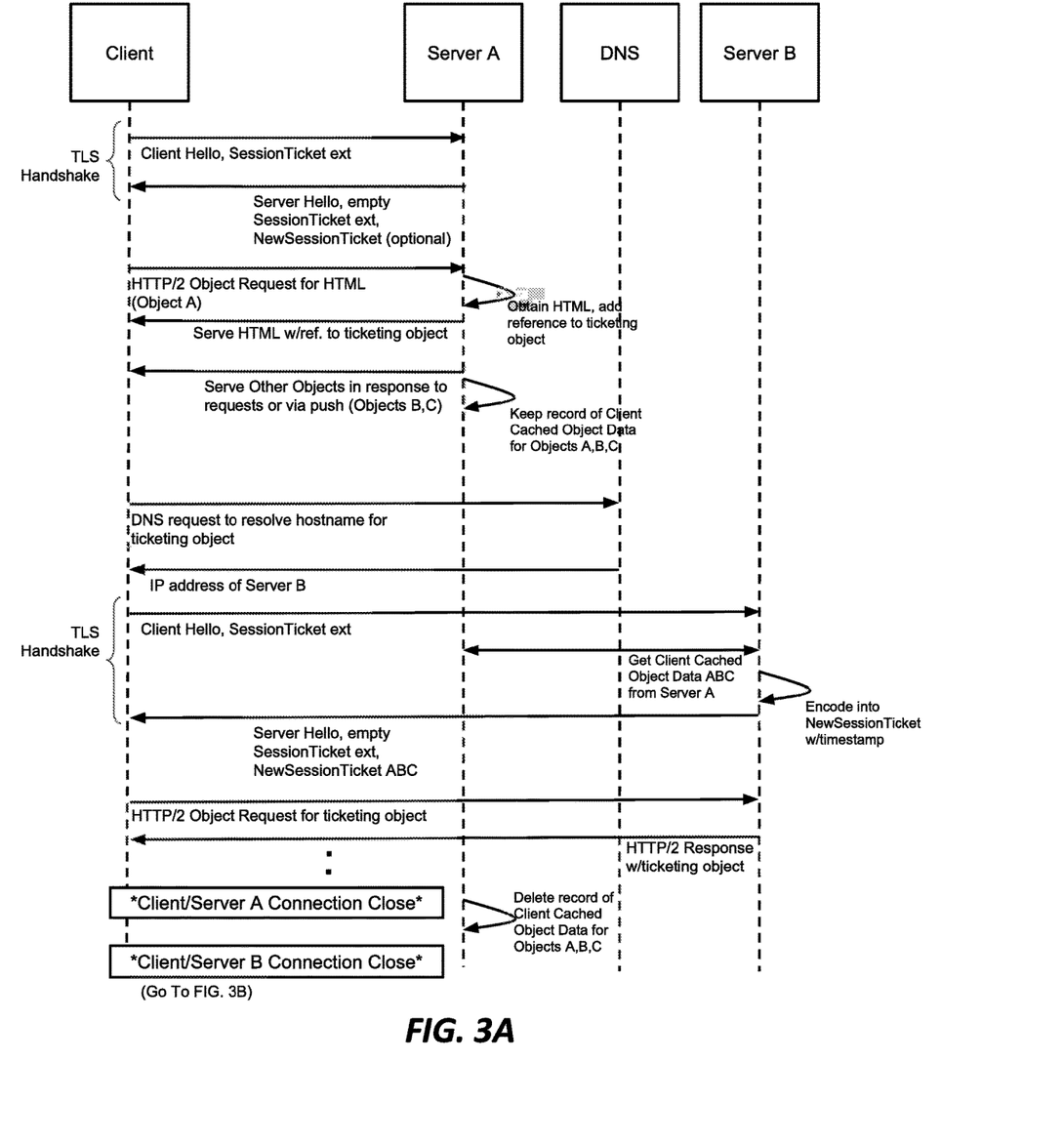
FIG. 3A is a diagram illustrating the message flow in the system between a client and a server, in accord with another embodiment.
Figure 3B:
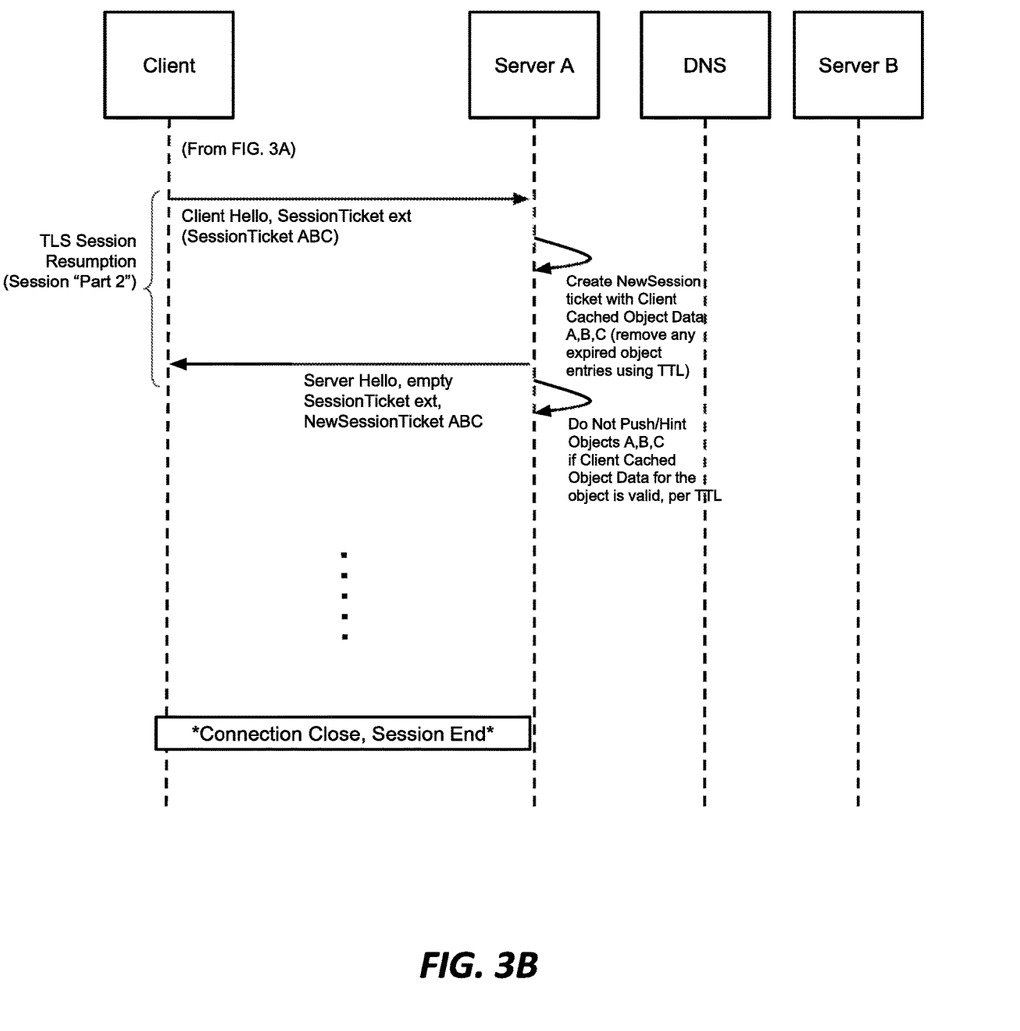
FIG. 3B is a continuation of the diagram of FIG. 3A.

With reference to FIGS. 3A-3B, initially the message flow is the same as in FIG. 2A. The client and server A complete a TLS handshake, the client issues object requests and/or server A pushes objects to the client. As those skilled in the art will realize, the first client object request is likely to be for the HTML document that defines the presentation of the web page that the end user is seeking to visit. Assume as before that the HTML document is on the hostname <foo_host>.com.

In this embodiment, the HTML document contains a reference to an object that is loaded preferably after the onLoad event in the client browser, or at another time in the page rendering process as dictated by a server configuration for a given website. Preferably, this is an HTML tag added to the HTML document by server A after retrieving the original HTML document from an origin server. The HTML tag contains a reference to a small-size object at a particular URL. The client will fetch this object, creating a new TCP connection and using the same TLS session to do so. As one non-limiting example, the object fetch can be triggered by a short script (e.g., Javascript inserted into the HTML by Server A) that is triggered on the onLoad event to asynchronously fetch the object.

The object URL preferably takes the following form: https://<ip_of_server_A>.<beacon_host>.com/<path_to_ticketing_object>

The <ip_of_server_A> is the IP address of the server to which the client is currently connected. The client must resolve this hostname; to do so it queries the DNS system. The IP address is resolved by the DNS system to a server with a different IP address but preferably in the same point of presence (also referred to as data center). This means that the DNS system, upon seeing the embedded IP address of Server A in the hostname, and possibly some other information encoded into the hostname (e.g., a flag to indicate the functionality being described is active), knows that the client is connected to Server A, and therefore should return the IP address of another server in the same point of presence. This second server is referred to here and in FIGS. 3A-3B as server 'B'. Preferably, server B is connected to server A via a local area network connection, although this is not a limitation hereof. (And, moreover, server B could be in a different data center, albeit with potentially reduced performance.)

The <beacon_host> is preferably a hostname that shares the same certificate as the base HTML page's hostname, which in this example was <foo_host>.com. Preferably the beaconing hostname is dedicated for this purpose and not the same hostname as the hostname used to fetch the base page HTML. The goal is to ensure that a wildcard of the target object's beacon_host is on the same SAN certificate (also referred to as a subject alternative name certificate or a multi-domain certificate) as the hostname used to connect to Server A and fetch the HTML document, which will therefore allow the client to use the same TLS session it used for downloading the HTML. Therefore, following this example, the SAN certificate presented by Server A might list (as a non-limiting example) the following hostnames:

```
www.<foo_host>.com
*.<beacon_host>.com
```

The <ticketing_object> is the target object. It is referred to as the ticketing object because the client request for this object will operate to store server A's current client cached object data in a ticket on the client, as is now explained.

Based on the DNS answer, and because the client receives back the distinct IP address of server B, the client makes a GET request for the ticketing object to the server B. This means that the client establishes a new TCP connection to server B with the same TLS session.

Upon receipt of the clientHello in the TLS handshake, server B examines the server name indication (SNI extension field) to find the beaconing hostname, which again is <ip_of_server_A>.<beacon_host>.com and this beaconing hostname is already covered under the wildcard hostname presented in the SAN certificate received from Server A.

Based on this, the content and format of the hostname in the SNI field, and in particular the encoded IP address within it, Server B executes a relatively quick LAN request to fetch the current client cached object data from server A, using the IP address that was encoded into the URL. In the meantime, Server A will have established the list of client cached object data based on what it pushed to the client and or served in response to a client request. FIGS. 3A-3B depicts the timing of these operations.

Server B encodes the client cached object data into a sessionTicket and in the ServerHello sets that ticket on the client, that is, using the NewSessionTicket extension, as previously explained.

In this way, Server A does not need to keep state for the client cached object data after the connection is closed. That is, Server A preferably keeps the client cached object data in local temporary memory while the session and connection is active. However, if and when the connection closes, Server A can delete this state from local memory. If and when the client resumes the TLS session with Server A, the client will send the session ticket that was set by Server B with the client cached object data. As before, Server A can use this information to suppress a push or hint operation for objects listed in the client cached object data.

Preferably, Server B encodes a timestamp into the session ticket. Server A reads this timestamp and thereby can determine whether the ticket is newer or older than its local temporary memory. Server A prefers the newest information.

Partially Stateless Server Embodiment with DNS System Simplification

In the above "Partially Stateless Embodiment," the DNS system was responsible for selecting Server B and ensuring that Server B was in the same point of presence as Server A. Specifically, when the client issued a DNS request for <ip_of_server_A>.<beacon_host>.com, the DNS system selected and returned the IP address of Server B.

In an alternate embodiment, the DNS system can be simplified by moving the responsibility for selecting Server B to be the responsibility of Server A. In other words, Server A can be responsible for constructing the URL for the ticketing object to encode the IP address of Server B, rather than encoding the IP address of Server A. Thus the URL for the ticketing object would be in the form of:

https://<ip_of_server_B>.<beacon_host>.com/<path_to_ticketing_object>

Typically, Server A knows the servers that it is connected to (again, preferably via LAN connection) in the point of presence. It selects one of these servers and encodes its IP address into the hostname as the IP address of Server B. When the DNS system receives the DNS query for <ip_of_server_B>.<beacon_host>.com, it simply needs to recognize the encoded IP address and return it to the client as the DNS answer.

Features and Benefits Over Cookie Approaches

While it is known in the art to store information about client cache state in a cookie, see, e.g., US Patent Publication No. 2016/0248866, the teachings hereof are distinct therefrom and provide several advantages over the use of cookies. For example, a TLS ticketing approach is more secure than a cookie, in that the manifest of cached client object URLs is not exposed. While of course a cookie can be encrypted, this is not always suitable. For example, it may be desired to have an intermediate device (e.g., a proxy or gateway in an enterprise network or in a carrier network, or other "man in the middle") have access to a signing certificate. This is often done for security, performance, or functional reasons. If an application encrypts client-cache information into a cookie in some unknown way, the intermediate device may not be able to decrypt the cookie and utilize the contents. Second, if the client cached object data is carried in a cookie, it is sent in a cookie along with the client's GET request, and so the server must wait for that message. The TLS ticketing approach gets the relevant data to the server faster, particularly when a preconnect approach is used to set up the TLS connection in anticipation of the GET. Third, if the manifests of cached client object data become large, putting that data in a cookie has the potential to cause a significant amount of additional traffic on the wire, whereas TLS tickets are once-per-session messages (at least in according to the definition in the RFC). Additional traffic, of course, can degrade page performance and negatively impact network use, particularly with mobile. Finally, storing client-cache state into TLS session Tickets prevents the exchange of the information to influence Navigation Timing API data, such as the time to first byte, time to first paint, and the page load time.

The foregoing are non-limiting examples of potential advantages and benefits that may be obtained through practice of the teachings hereof. It is not necessary to obtain such advantages and benefits in order to practice the teachings hereof.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
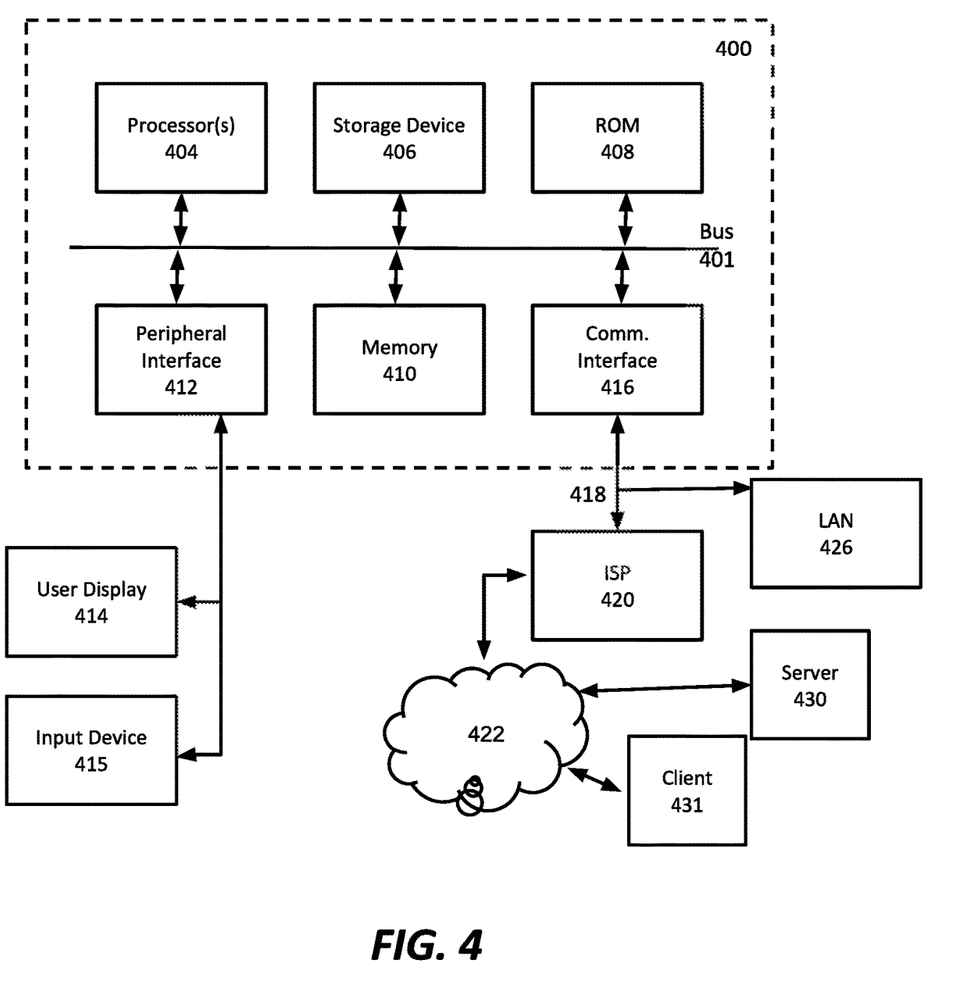
FIG. 4 is a block diagram illustrating hardware in a computer system that may be used to implement the teachings hereof.

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 400 includes a microprocessor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 communicatively couples computer system 400 to a user display 414 that displays the output of software executing on the computer system, and an input device 415 (e.g., a keyboard, mouse, trackpad, touchscreen) that communicates user input and instructions to the computer system 400. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer,) between the system bus 401 and an external communication link. The communication interface 416 provides a network link 418. The communication interface 416 may represent a Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 418 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A non-transitory computer readable medium on a client device, comprising:
   a TLS session ticket storing client cached object data, the client cached object data:
      (i) having been generated by and received from a server in the TLS session ticket for storage on the client device, and,
      (ii) comprising information about one or more objects that the server sent to the client device, such one or more objects being distinct from the client cached object data;
   computer program instructions executable on the client device to cause the client device to:
   receive the TLS session ticket with the client cached object data from the server and store the TLS session ticket locally; and,
   subsequent to TLS session ticket being received from the server and stored on the client device, provide the client cached object data from the TLS session ticket back to the server or another server so as to prevent the server or the another server from pushing at least one of the one or more objects to the client device.

2. The non-transitory computer readable medium on a client device, as recited in claim 1, wherein the client cached object data comprises: a URL for each of the one or more objects.

3. The non-transitory computer readable medium on a client device, as recited in claim 1, wherein the client cached object data comprises: a time to live (TTL) for each of the one or more objects.

4. The non-transitory computer readable medium on a client device, as recited in claim 1, wherein the client cached object data comprises: a timestamp associated with each of the one or more objects, the timestamp indicating when the server fetched the associated object from an origin server.

5. The non-transitory computer readable medium on a client device, as recited in claim 1, wherein the client cached object data comprises: a Bloom filter for testing whether a given object is one of the one or more objects sent by the server.

6. The non-transitory computer readable medium on a client device, as recited in claim 1, wherein the client cached object data comprises: a list of objects with a Boolean indicator of true or false.

7. The non-transitory computer readable medium on a client device, as recited in claim 1, wherein the client cached object data resides in an opaque encrypted state field of the TLS session ticket.

\* \* \* \* \*